United States Patent [19]

Carlson

[11] 4,110,944
[45] Sep. 5, 1978

[54] ANIMAL PROTECTIVE GUARD

[76] Inventor: Gaynor Carlson, 28 N. Second St., Atwood, Kans. 67730

[21] Appl. No.: 759,463

[22] Filed: Jan. 14, 1977

[51] Int. Cl.² ........................................... A01M 29/00
[52] U.S. Cl. ...................................... 52/101; 256/12
[58] Field of Search ............ 174/5 R, 38, 40 R, 45 R, 174/136, 139; 49/58, 59, 60; 52/40, 101, 147, 173 R; 119/1, 96; 256/1, 2, 3, 11, 12; 47/23, 24

[56] References Cited

U.S. PATENT DOCUMENTS

| | | | |
|---|---|---|---|
| 1,130,287 | 3/1915 | Horvath | 256/11 X |
| 1,237,601 | 8/1917 | Arthur | 256/11 |
| 1,278,618 | 9/1918 | Eikenberry | 256/11 |
| 1,512,618 | 10/1924 | McDonald | 47/24 |
| 1,546,094 | 7/1925 | Marbaugh | 256/11 |
| 1,980,852 | 11/1934 | Dandliker | 256/11 |
| 3,084,913 | 4/1963 | Cox | 256/11 |
| 3,400,503 | 9/1968 | Schaller | 52/40 X |
| 3,611,651 | 10/1971 | Carlson | 52/101 |

FOREIGN PATENT DOCUMENTS

| | | | |
|---|---|---|---|
| 54,235 | 11/1890 | Fed. Rep. of Germany | 47/24 |
| 380,265 | 9/1923 | Fed. Rep. of Germany | 256/12 |
| 612,265 | 11/1948 | United Kingdom | 256/12 |

OTHER PUBLICATIONS

Abstract of Canadian Patent No. 177,418, Jun. 5, 1917, to Hassett.

Primary Examiner—Laramie E. Askin
Attorney, Agent, or Firm—Sheridan, Ross, Fields & McIntosh

[57] ABSTRACT

An animal guard assembly for protecting pedestals for underground telephone lines or electrical transmission lines comprising an animal guard assembly carrying animal repelling elements, such as, barbs, mounted on a support arm and means for removably attaching the support arm to a pedestal or a support for the pedestal in various positions so that the animal guard assembly can be moved to various orientations to protect the pedestal against rubbing by animals, and the support arm carrying the barbs removed to permit workmen to work around the pedestal.

9 Claims, 6 Drawing Figures

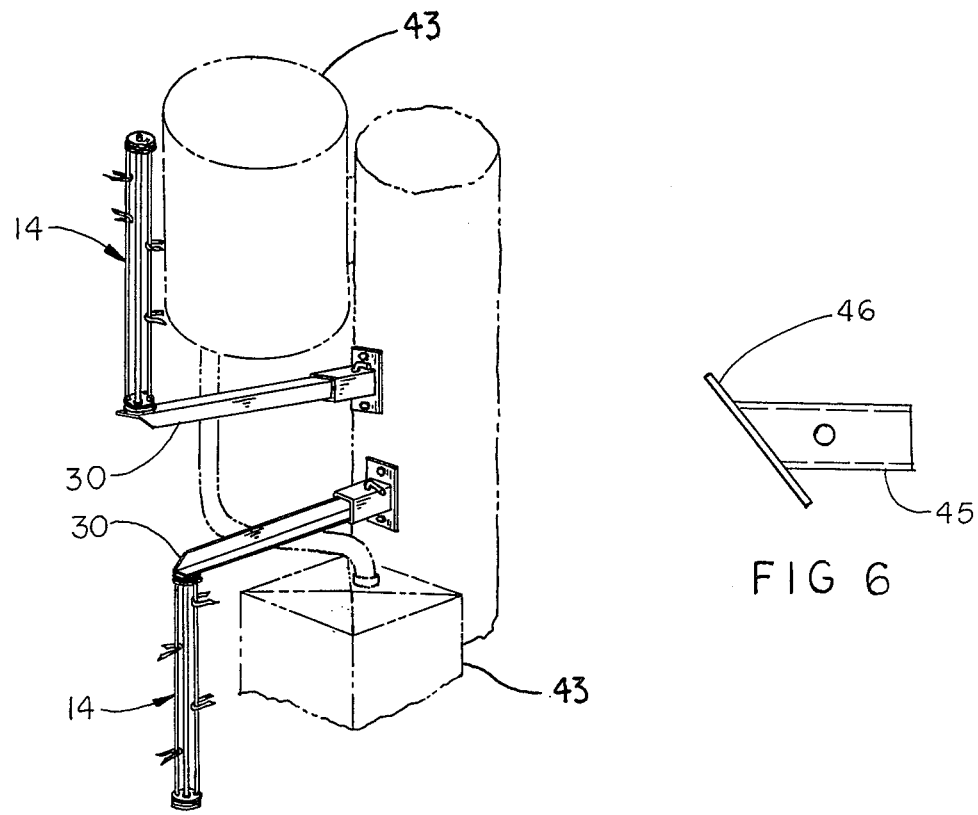
FIG 3
FIG 6
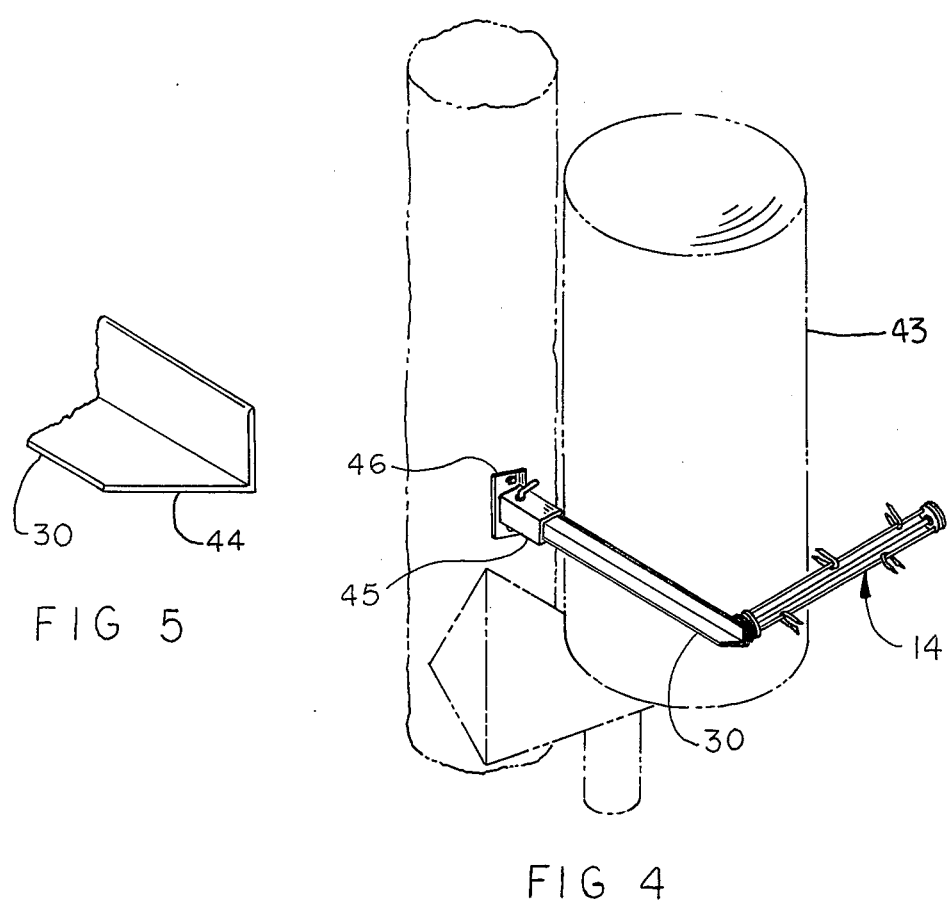
FIG 5
FIG 4

ANIMAL PROTECTIVE GUARD

BACKGROUND OF THE INVENTION

In the maintenance of underground telephone and other electrical transmission lines it is necessary to connect electrical test equipment and other type equipment into the lines at spaced intervals for various purposes, such as, locating a short, a damaged section, and for other purposes. "Pedestals" located approximately a mile apart and containing wire closures, relays, repeaters and other test elements are used in connection with this maintenance. The pedestals are stake or pole mounted. With the stake mounted type no pole is required, although a stub pole is often set adjacent the stake for added support.

Pedestals for underground electrical transmission lines, which often pass through extensive ranching areas where animals, such as cattle, sheep and pigs are present, must be protected from animals scratching or rubbing on and damaging them. Devices for guarding against animals rubbing against various elements are disclosed in U.S. Pat. Nos. 1,923,858; 3,362,115; 3,400,503 and 3,611,651. A disadvantage of prior art guard devices for protecting electrical pedestals against animal contact is that the guard elements are not removable to permit access of workman to the pedestal.

The protective or guard devices in the patents referred to above take the form of barbs or pointed devices protruding outwardly from a support which is attached to the object to be protected. In the protection of pedestals to which workmen must periodically have access, the protective device interferes with such access. Therefore, there is a need for a removable guard device for pedestals, stub shafts and other post-like support devices.

Accordingly, it is an object of this invention to provide an animal guard assembly for electrical pedestals and support elements for them which is an effective guard against animals rubbing or scratching against them and in which the barbed structure of the assembly can be readily removed to permit access of workmen to the pedestal or support member and replaced in operative arrangement after the work is finished.

SUMMARY OF THE INVENTION

An animal guard assembly for protecting pedestals for underground telephone lines or electrical transmission lines comprising an animal guard assembly carrying animal repelling elements, such as, barbs, mounted on a support arm and means for removably attaching the support arm to a pedestal or a support for the pedestal in various positions so that the animal guard assembly can be moved to various orientations to protect the pedestal against rubbing by animals, and the support arm carrying the barbs removed to permit workmen to work around the pedestal.

BRIEF DESCRIPTION OF THE DRAWINGS

FIG. 3 is a partial perspective view for purposes of illustration of one of the animal protective guard assemblies of the invention mounted on a pole to protect a pole mounted pedestal and of the lower assembly mounted on the pole to protect a pedestal mounted on an adjacent stub shaft.

FIG. 4 is a front view of a modification of the guard assembly of the invention mounted on a pole for protecting a pedestal, the assembly constructed to be mounted to the side of a shielded wire under a dome so that the guard element extends in front of the pedestal;

FIG. 5 is a partial top view of a modification of the support arm for mounting the guard element of the invention showing how its end, attached to the base plate, is cut at an angle for supporting the guard element in the orientation shown in FIG. 4, and FIG. 6 is a showing similar to that of FIG. 5.

DESCRIPTION OF THE PREFERRED EMBODIMENTS

The invention will now be described with reference to the drawings.

Figure 1:
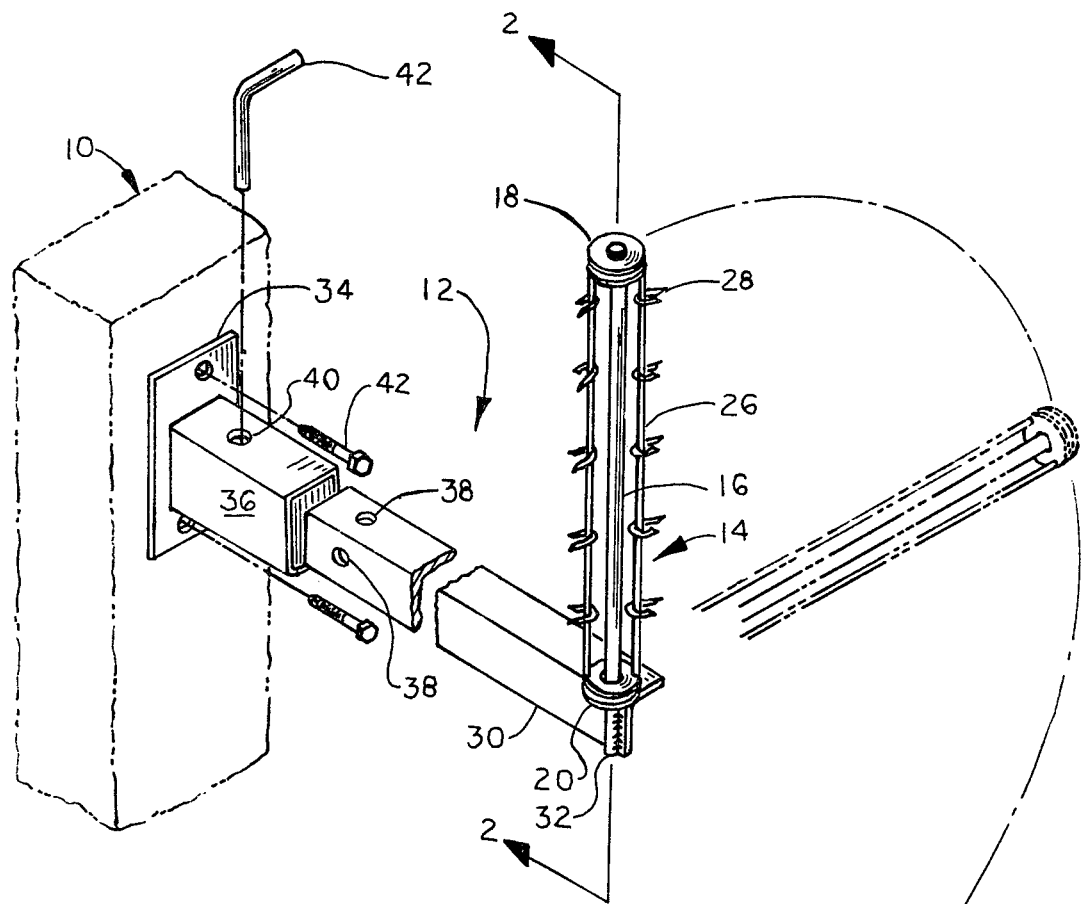
FIG. 1 is a partial perspective view of the animal protective guard assembly of the invention showing the manner in which it is mounted on a support member such as a pole or a stub shaft.

Referring to FIG. 1, showing the animal guard assembly mounted on a stub shaft represented schematically at 10, the guard assembly of the invention is represented generally by the numeral 12 and the barb support element is represented generally by the numeral 14.

Figure 2:
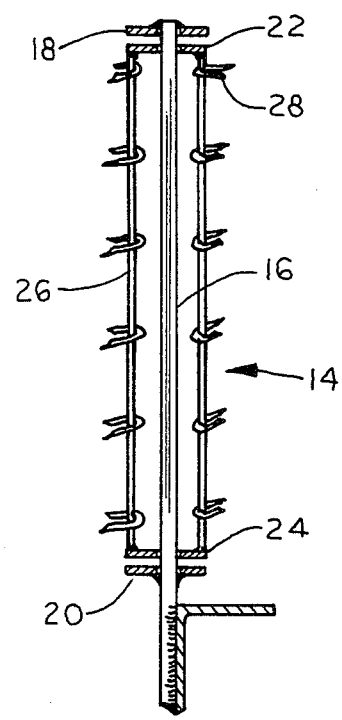
FIG. 2 is a cross-sectional view of the guard element of the assembly taken on line 2—2 of FIG. 1.

Referring to FIGS. 1 and 2, the barb support element 14 is comprised of central support rod 16 having a cap or stop member 18 secured at its top or free end and a lower support plate 20 secured to rod 16 below the cap which also serves as a stop or thrust bearing surface. The cap 18 may be fixedly or removably secured to the free end of the central support rod 16.

Referring to FIG. 2, the barb support element 14 is mounted around the central support rod 16 between the cap 18 and the support plate 20, and lower end plate 24 connected by a plurality of circumferentially spaced vertical guard rods 26 which support a plurality of animal repelling elements or barbs 28 which in this modification take the form of staples. The end plates 22, 24 are each provided with a central hole through which the central support rod 16 is mounted. Tolerance is provided between the holes and the central support rod so that the barb support element is rotatable on the central support rod 16.

Referring again to FIG. 1, for mounting barb support element 14 on a stub shaft 10, a horizontal support arm 30 is provided. The support arm in this modification is an angle iron. The barb support element 14 is affixed at its lower end to the outer end of the support arm 30 by means of extension 32 of rod 16 which is welded to one side of the angle iron as shown.

For attaching the support arm 30 to the stub shaft 10, a base plate 34 is provided for securing to the stub shaft by means of screws or other suitable means. A sleeve member 36 for holding one end of the support arm 30 is welded or otherwise secured to the base plate 34. The dimensions of the horizontal arm 30 are such that its free end will fit snugly into the interior of the sleeve member 36. For removably securing the free end of the support arm 30 into the sleeve member 36, holes 38, 90° apart, are provided in the free end of the support arm which mate with holes 40 (the bottom hole not shown) in the sleeve member 180° apart. The support arm 30 and the sleeve member 36 are locked together after assembly by inserting the pin or bolt 42 through the top hole 40 through either of the holes 38, depending on whether lateral or vertical positioning of the guard assembly is desired, and down through the bottom hole 40 in the sleeve member 36. A threaded bolt and threaded holes 40 can be used.

By the construction shown, the support arm 30 is adjustably attached to the sleeve member 36 so that the barb support element 14 may be supported or positioned in four angular positions, 90° apart, and is readily removable to permit access of workmen to the pedestal it guards. Thus, the barb support element 14 can be positioned as desired to provide the best protection.

Referring to FIG. 3, the upper guard assembly is shown mounted to a pole with the barb supporting member 14 extending upwardly in a vertical position to protect a pole mounted pedestal 43, and the lower guard assembly is shown mounted to a pole with the barb supporting member 14 extending downwardly to protect a pedestal 43 mounted on a stub shaft adjacent a pole.

FIG. 4 shows an assembly in which the support arm 30 is cut at an angle at the end by which it is attached to base plate 34 so that when the base plate is mounted on a pole the support arm 30 will be positioned to the side of a shielded wire under a dome so that the guard element extends in front of the pedestal 43, this being one of the applications of the guard assembly.

FIG. 5 shows the support arm 30 cut at an angle 44 to permit mounting of the barb support element in an orientation like that shown in FIG. 4.

FIG. 6 is a showing similar to that of FIG. 5 in which the numerals 45 and 46 correspond to the numerals 36 and 34, respectively, of FIG. 1.

Obviously, the means for adjustably connecting the horizontal support arm 30 to the sleeve member 36 is only one means for making the adjustable position attachment, as other means could be used. For example, the sleeve member 36 and support arm 30 could be of tubular construction so that the guard assembly unit 12 could be supported in any angular orientation. The guard assembly unit 12 could be of a different construction for serving the purposes of the invention. For example, it could be in the form of a single support rod carrying the barbs. The described configuration has the advantage that the barbs are supported in a manner so that the vertical guard rods supporting them rotate when an animal is rubbing against them and thus minimize the danger of injuring the animal. The barbs 28 can be single barbs or other type structure just so they have sharp points protruding outwardly. Likewise, the guard assembly may be made of steel, plastic or other suitable material, as is well known in the art.

From the above description it is seen that a protective guard assembly has been provided by the invention which is safe for animals, can be mounted to protect an electrical pedestal in practically any location, and in which the barb supporting elements can be removed with the barbs to permit workmen to safely work around the pedestal and replaced after the work is finished.

What is claimed is:

1. An animal guard assembly for protecting an electrical pedestal mounted on or adjacent a post-like member such as a stub shaft comprising:
   (a) a base plate for attachment to said post-like member;
   (b) a sleeve member secured to said base plate for holding a supoort arm in various angular positions;
   (c) a support arm adjustably and removably secured by one end within said sleeve member for holding a guard assembly, said guard assembly comprising:
      (1) a central support rod attached by one end to said support arm;
      (2) a barb supporting element;
      (3) a cap or stop member secured to the free end of said central support rod;
      (4) a support plate secured to said central support rod at a point spaced from said cap;
   (d) said barb supporting element being mounted on said central support rod between said cap and said support plate, and comprising:
      (1) a top plate having a central hole therein and a bottom plate having a central hole therein connected by at least one barb supporting rod-like member having barbs supported thereon.

2. The animal guard assembly of claim 1 in which said cap or stop member is removably secured.

3. The animal guard assembly of claim 1 in which said sleeve member and said one end of said support arm are provided with mating holes and including a locking pin for fitting in said mating holes to lock said support arm in different angular positions in said sleeve member.

4. The animal guard assembly of claim 3 in which said support arm is an angle iron.

5. The animal guard assembly of claim 1 in which said barb supporting element is rotatable about said central support rod.

6. The combination of at least one animal guard assembly of claim 1 with a post-like member.

7. An animal guard assembly for attachment to a post-like member or a post-like member having an electrical pedestal mounted thereon or adjacent thereto comprising:
   (a) a barb supporting assembly;
   (b) an elongated support arm, said barb supporting assembly being attached to one end of said elongated support arm; and
   (c) means for securing the end of said elongated support arm opposite said bar supporting assembly to said post-like member for protecting it or said electrical pedestal against rubbing by animals, said securing means including a quick release means for quickly and easily removing said arm and barb assembly from the member when desired;
   (d) said barb supporting assembly comprising:
      (1) a central support rod and a barb supporting element, one end of said support rod being attached to said elongated support arm;
      (2) a cap or stop member secured to the free end of said central support rod;
      (3) a support plate secured to said central support rod at a point spaced from said cap; and
      (4) said barb supporting element being rotatably mounted around said support rod between said cap and said support plate and comprising a top plate having a central hole therein and a bottom plate having a central hole therein connected by at least one barb supporting guard rod having barbed elements thereon, said holes in the top and bottom plates being sized to allow said barb supporting element to freely turn around said support rod.

8. The animal guard assembly of claim 7 in which said securing means comprises a sleeve member for attachment to said post-like member into which one end of said support arm is releasably secured.

9. The animal guard assembly of claim 7 in which said securing means includes a means which allows the position of the barb supporting assembly to be varied with respect to the post-like member or electrical pedestal for aiding the protection thereof.

* * * * *